Figure 1:
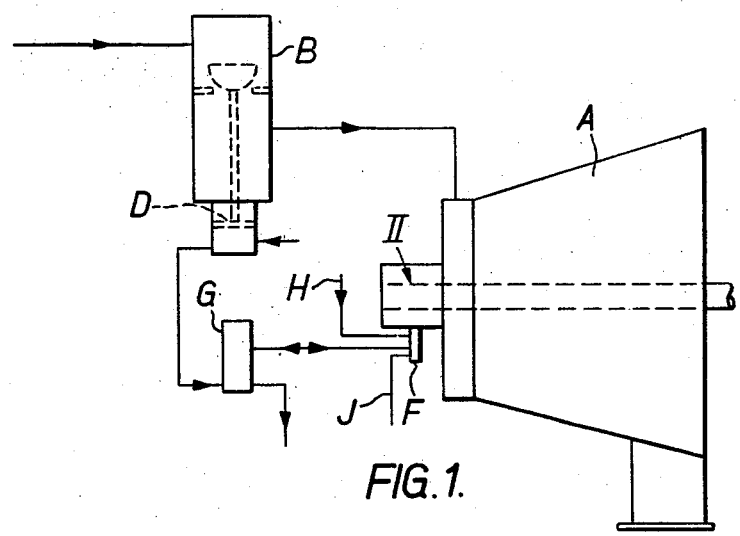

Jan. 19, 1965  T. L. GARDNER  3,165,935

OVERSPEED TRIP DEVICES FOR TURBINES

Filed July 10, 1963

United States Patent Office 3,165,935
Patented Jan. 19, 1965

3,165,935
OVERSPEED TRIP DEVICES FOR TURBINES
Thomas Lowthian Gardner, Sale, England, assignor to Associated Electrical Industries Limited, London, England, a British company
Filed July 10, 1963, Ser. No. 294,104
Claims priority, application Great Britain July 20, 1962
5 Claims. (Cl. 73—548)

This invention relates to improvements in overspeed trip devices for rotary machines such as turbines, and more particularly to trip devices of the well known spring loaded bolt type.

It is common practice to provide a steam turbine with an emergency governor of the eccentric bolt type, the bolt being fitted diametrically to the turbine shaft near the end which is not coupled to the load. The centrifugal force on the bolt is opposed by the compression of a spring. The initial compression of the spring is so adjusted that the two forces exerted on the bolt respectively by the spring and by centrifugal force are just balanced when the turbine speed exceeds its normal speed by about 10 percent. At this speed, the bolt flies out radially to its full extent and actuates a gear which trips the main stop valve of the turbine and shuts off the supply of steam to the turbine. The turbine cannot be restarted until the trip gear associated with the trip volt has been re-set.

The application of turbines to naval craft often necessitates that they should be capable of withstanding comparatively high shock forces applied to the complete turbine installation and producing large accelerations of the installation. It is found that, if the turbine rotor is in, or turns through, certain angular positions while these shock forces are acting on it, the inertia of the trip bolt is sufficient to compress its controlling spring, so that the trip bolt moves out radially to its tripping position, and trips the turbine stop valve.

An object of the present invention is the provision of an improved overspeed trip bolt device for rotary machines such as turbines, which does not suffer from the above disadvantage.

According to the present invention, an overspeed trip device for a rotary machine comprises a plurality of bodies mounted in or on the rotor of the machine and coupled together by pivoted lever means in such a manner that the bodies can move together relative to the rotor in substantially parallel paths which extend transversely to the longitudinal axis of the rotor so that a first of the bodies moves in the opposite direction to a second of the bodies, at least one of the bodies having its centre of mass offset from the axis of the rotor so that upon rotation of the rotor centrifugal force tends to move that body along its said path outwardly from the rotor axis, and spring means arranged to prevent or limit this outward movement until a predetermined maximum safe rotor speed is reached, and upon the occurrence of an excessive speed to permit that body to move outwardly to cause operation of trip gear arranged to slow or stop the machine, the masses of the bodies and the lever means and the mechanical advantage of the lever means being so selected that transverse accelerations of the rotor fail to cause sufficient relative movement between the first and second bodies and the rotor along the said paths to cause operation of the trip gear.

Figure 2:
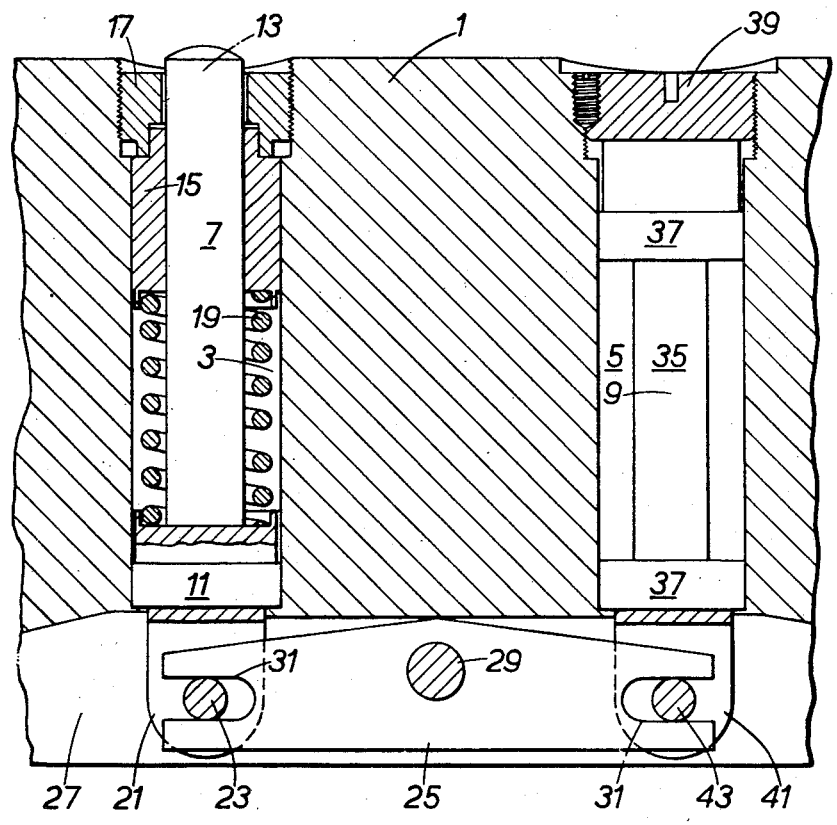

The invention will now be described, by way of example, with reference to the accompanying drawings, in which:

FIGURE 1 is a schematic drawing of a steam turbine provided with an overspeed trip mechanism; and FIGURE 2 is a sectional side elevation of a small part of the turbine shaft shown in FIGURE 1, near the end of the shaft which is not coupled to the load, and which is indicated by the numeral II in FIGURE 1.

Referring first to FIGURE 1, the steam turbine A is normally supplied with steam through a stop valve B which includes manual or power operated operating means (not shown) and also an emergency closing device normally held inoperative by a piston D arranged in a suitable cylinder and normally supported by a cushion of oil. Release of the oil pressure in this cylinder permits the emergency closing device to shut the stop valve B rapidly. Mounted on the turbine shaft 1 is a trip bolt (see FIGURE 2) which normally is held in place radially by a spring but can move outwardly under centrifugal force if the rotor speed exceeds its normal operating speed by 10 percent. This outward movement of the trip bolt releases the spring loaded plunger of an oil valve F, and permits a chamber in relay G, which is normally fed from an oil supply H, to be vented through a pipe J. When this chamber is so vented, a valve in the relay is caused to vent the chamber containing the piston D. The stop valve B then closes, and remains closed until the spring loaded plunger of oil valve F is manually reset. Such mechanisms, with minor mechanical variations, are used on most large steam turbines.

The turbine shaft 1 is formed with two diametrical parallel bores 3 and 5 in which are mounted two bodies 7 and 9 respectively. Body 7 is in the form of a bolt having a head 11 and a stem 13, the stem 13 extending through a guide 15 fitted in the upper end of the bore 3 (when the shaft is positioned as shown in the drawings) and retained by a screw-threaded plug 17 screwed into a complementary part of the bore 3. A compression spring 19 acts between the lower face of the guide 15 and the upper face of the bolt head 11 and resists upward movement of the bolt. The upper end of the stem 13 is slightly proud of the surface of the shaft. The lower end of the body 7 is in the form of a clevis 21 and is connected by a clevis pin 23 to one arm of a lever 25. Lever 25 extends axially of the shaft inside a groove 27 formed in the shaft, and is mounted on a pivot pin 29. At each end the lever 25 is formed with a slot 31, and pin 23 fits inside one of these slots.

Body 9 includes a central stem 35 formed at each end with an enlargement or land 37. Upward movement of body 9 in the bore 5 is limited by a screw-threaded plug 39 screwed into the upper end of the bore. The lower end of the body 9 is also in the form of a clevis 41 and is connected to the lever 25 by a clevis pin 43 fitting within the second of the two slots 31.

The mass of the body 9 is approximately equal to the mass of the body 7, and the lever 25 is symmetrical about its pivot pin 29 which is equidistant from the two bores 3 and 5. As a result, should the shaft 1 be subjected to a transverse acceleration in the direction of the lengths of the two bores 3 and 5, the forces on the assembly of bodies 7 and 9 of the lever 25 are in equilibrium and no movement of the two bodies 7 and 9 along the bores 3 and 5 takes place.

During normal operation of the turbine, the prestressed spring 19 holds bodies 7 and 9 in the positions shown in the drawing, in which body 9 is pressed upwardly against the plug 39. The centre of mass of body 7 is above the central axis of the shaft 1, while the centre of mass of body 9 is on or substantially on that axis. As a result, when the shaft 1 is rotated centrifugal force tends to move body 7 so that stem 13 projects further from the surface of the shaft. The force exerted by the spring 19 is sufficient to overcome the centrifugal force as long as the speed of the shaft falls below a predetermined maximum safe shaft speed limit, but upon the occurrence of an excessive speed the spring 19 is further compressed so that the stem 13 can project further from the shaft and so operate the trip gear which, by closing the turbine stop valve, stops the turbine.

If desired, the construction shown can be modified by replacement of the spring 19 with a spring acting on the body 9 or springs can act on both bodies 7 and 9 in a complementary manner. Further, one of the two bodies can constitute the eccentric mass while the other body is moved by the lever to project from the shaft to operate the trip gear. Both bodies 7 and 9 can have their centres of the mass displaced from the axis of the shaft in opposite directions, so that their centrifugal operating forces are additive.

It is not essential that the two bodies 7 and 9 shall have equal masses, since by an appropriate choice of the lengths of the two arms of the lever 25 to provide a mechanical advantage equal to the ratio of the masses of the two bodies, the forces set up by transverse acceleration of the shaft can be balanced. It is necessary in such a case to balance the lever 25 about the pivot pin 29.

Although preferably the masses of the two bodies and of the lever and the mechanical advantage of the lever should be chosen so that transverse acceleration of the shaft shall not set up unbalanced forces on the assembly, in some cases, in which the magnitude of the transverse acceleration to be accommodated can be predicted, it is possible to accept an arrangement in which the forces set up, while not fully balanced out are insufficient to effect operation of the trip gear associated with the shaft 1.

The invention is applicable both to steam turbines and to gas turbines in which it is desired to provide an overspeed trip device. It can also be applied to other rotary devices such as rotary converters.

What I claim is:

1. An overspeed trip device for a rotary machine, comprising:
   (a) a plurality of bodies mounted in or on the rotor of the machine;
   (b) pivoted lever means coupled to each of the plurality of bodies in such a manner that the bodies can move relative to the rotor in substantially parallel paths which extend transversely to the longitudinal axis of the rotor and in such a manner that a first of the bodies moves in the opposite direction to a second of the bodies; one of the bodies having its centre of mass offset from the axis of the rotor so that upon rotation of the rotor centrifugal force tends to move that body along its said path outwardly from the rotor axis,
   (c) spring means carried by the rotor and arranged to act upon the bodies to prevent or limit this outward movement of the said body of offset centre of mass, until a predetermined maximum safe rotor speed is reached, and upon the occurrence of an excessive speed to permit the body to move outwardly; and
   (d) trip gear external to the rotor and arranged when tripped to slow or stop the machine, and having a triggering member so arranged that it is released by the said body, or parts moving with it, only when outward movement of the said body has taken place; the masses of the bodies and the lever means and the mechanical advantage of the lever means being so selected that transverse accelerations of the rotor fail to cause sufficient relative movement between the first and second bodies and the rotor along the said paths to cause operation of the trip gear.

2. An overspeed trip device according to claim 1, in which two such bodies are provided and the lever means comprise a two-armed lever provided with a fulcrum intermediate its ends while the two bodies are coupled to the lever respectively on opposite sides of the fulcrum.

3. An overspeed trip device according to claim 1, in which the lever means are contained in an axially extending groove or slot provided in the rotor.

4. An overspeed trip device according to claim 1, in which the spring means act upon the body which has its centre of mass offset from the axis of the rotor, and the other body is biased by the spring through the lever means, at normal speeds of the rotor, against an abutment on the rotor.

5. A turbine provided with an overspeed trip device according to claim 1.

References Cited in the file of this patent

UNITED STATES PATENTS

| | | |
|---|---|---|
| 606,877 | Reynolds | July 5, 1898 |
| 1,623,822 | Wilkinson | Apr. 5, 1927 |
| 1,925,846 | Parkhill | Sept. 5, 1933 |
| 2,926,899 | Gaubatz | Mar. 1, 1960 |